(12) United States Patent
Sakai et al.

(10) Patent No.: US 9,019,716 B2
(45) Date of Patent: Apr. 28, 2015

(54) PLATE MEMBER, BUS BAR AND ELECTRIC JUNCTION BOX HAVING THE BUS BAR

(75) Inventors: Suguru Sakai, Makinohara (JP); Yoshihito Imaizumi, Makinohara (JP); Hiroaki Takahashi, Makinohara (JP); Ryouta Ando, Makinohara (JP)

(73) Assignee: Yazaki Corporation, Tokyo (JP)

( * ) Notice: Subject to any disclaimer, the term of this patent is extended or adjusted under 35 U.S.C. 154(b) by 232 days.

(21) Appl. No.: 13/449,414

(22) Filed: Apr. 18, 2012

(65) Prior Publication Data

US 2012/0268907 A1 Oct. 25, 2012

(30) Foreign Application Priority Data

Apr. 21, 2011 (JP) .................................. 2011-094992

(51) Int. Cl.
*H01R 9/00* (2006.01)
*B60R 16/023* (2006.01)
*H01R 13/05* (2006.01)
*H01R 13/11* (2006.01)
*H01R 43/16* (2006.01)

(52) U.S. Cl.
CPC .......... *B60R 16/0238* (2013.01); *H01R 13/055* (2013.01); *H01R 13/112* (2013.01); *H01R 43/16* (2013.01)

(58) Field of Classification Search
CPC ............. B60R 16/0238; H01R 13/055; H01R 13/112; H01R 43/16
USPC ....... 361/622, 624, 648, 775; 174/72 B, 68.2, 174/250; 439/76.2, 78, 81, 213, 850
See application file for complete search history.

(56) References Cited

U.S. PATENT DOCUMENTS

| 5,490,794 | A | * | 2/1996 | Kobayashi et al. | ........... 439/212 |
| 6,141,872 | A | | 11/2000 | Takanashi | |
| 6,196,882 | B1 | * | 3/2001 | Sato et al. | ...................... 439/701 |
| 7,671,275 | B2 | * | 3/2010 | Kubota | ........................... 174/50 |
| 2003/0134528 | A1 | * | 7/2003 | Tanaka et al. | ................. 439/76.2 |
| 2013/0115790 | A1 | * | 5/2013 | Baba et al. | ....................... 439/83 |

FOREIGN PATENT DOCUMENTS

| CN | 1239341 A | 12/1999 |
| CN | 2624438 Y | 7/2004 |
| JP | 09-045213 A | 2/1997 |

OTHER PUBLICATIONS

Chinese Office Action dated Mar. 11, 2014 issued for corresponding Chinese Patent Application No. 201210179264.9.

* cited by examiner

*Primary Examiner* — Yuriy Semenenko
(74) *Attorney, Agent, or Firm* — Locke Lord LLP (57) ABSTRACT

The present invention is to provide a plate member which can improve material yield. The plate member forms a bus bar attached to a box main body of an electric junction box and includes a first terminal portion, a second terminal portion, and a connection coupling the first terminal portion to the second terminal portion. The plate member includes a first terminal portion equivalent corresponding to the first terminal portion, a second terminal portion equivalent corresponding to the second terminal portion, and arranged with a space against the first terminal portion equivalent along a longitudinal direction of a first terminal equivalent, and a connection equivalent corresponding to the connection. The connection equivalent couples the first terminal equivalent to the second terminal equivalent so that longitudinal directions of the first and second terminal equivalents are arranged parallel to each other.

5 Claims, 6 Drawing Sheets

FIG. 9
PRIOR ART ent Document 1 has a box main body, a bus bar 100 (shown
PLATE MEMBER, BUS BAR AND ELECTRIC JUNCTION BOX HAVING THE BUS BAR The priority application Number Japan Patent Application No. 2011-094992 upon which this patent application is based is hereby incorporated by reference.

BACKGROUND OF THE INVENTION

1. Field of the Invention

The present invention relates to a plate member for forming a bus bar of an electric junction box which is mounted on a vehicle as a moving object, a bus bar, and an electric junction box having the bus bar.

2. Description of the Related Art

Various electronic devices, in general, for example a lamp such as a head lamp and a tail lamp, a motor such as a starter motor and a motor for air conditioner, are mounted on a vehicle as a moving object.

The vehicle arranges a junction block in a suitable place so as to supply electric power with the various electronic devices. The junction block is constructed with an electric circuit unit including a plurality of fuses, a relay and the like.

Incidentally, the junction block is referred to as a junction block, a fuse block, or a relay box since the junction block has a fuse, a relay, a bus bar and so on. In this description, the fuse block, the relay box and the junction block are collectively called the electric junction box (for example, Patent Document 1) hereafter.

The conventional electric junction box disclosed in the Patent Document 1 has a box main body, a bus bar 100 (shown in FIGS. 7 and 8) attached to the main body, an upper cover, and a lower cover. Electric components such as a relay, a fuse and so on are installed in the upper surface of the box main body, and a connector of a wiring harness is installed in the lower surface thereof. The bus bar 101 connects a terminal of the electric component to the terminal of the connector of the wiring harness with a predetermined pattern. The upper cover covers the upper surface of the box main body, and the lower cover covers the lower surface thereof. Furthermore, a power cable in which electric power from a battery of the vehicle or an electric generator is supplied is attached to the box main body.

The electric power from an electric source is supplied from the power cable, and the electric power is divided from the power cable, the bus bar 100 and so on. Thereafter, the electric power flows in the fuse or the relay, and the above electric junction box supplies electric power to various electronic devices through a wire of the wiring harness.

Figure 7:
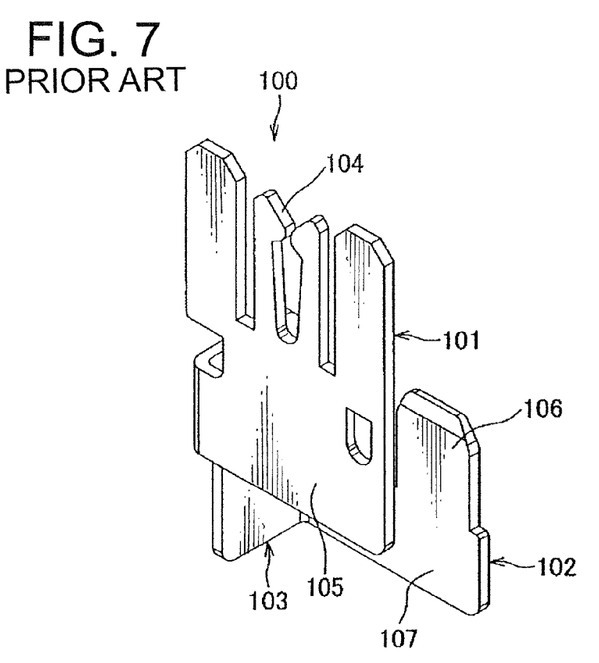
FIG. 7 is a perspective view showing a conventional bus bar.
Figure 8:
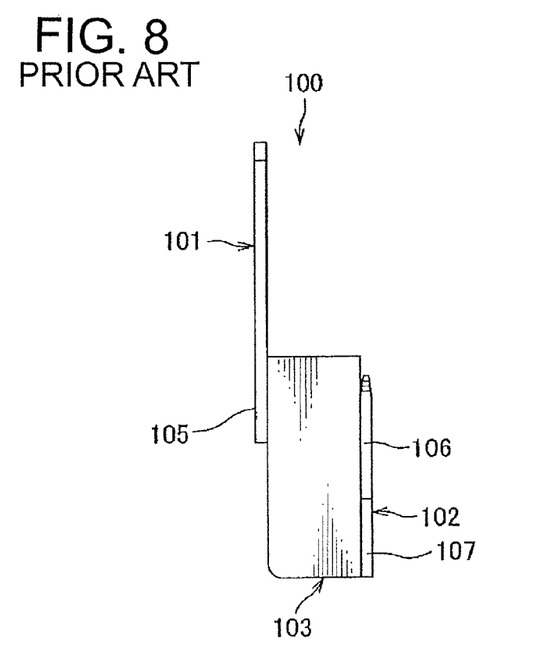
FIG. 8 is a side view of the bus bar shown in FIG. 7.

As shown in FIGS. 7 and 8, the bus bar 100 has integrally a first terminal portion 101 connected to the fuse, a second terminal portion 102 connected to the relay, and a connection 103 coupling the first terminal portion 101 and the second terminal portion 102.

The first terminal 101 has integrally a first terminal 104 connected to a terminal of the fuse, and a base portion 105 continuing to a base end of the first terminal 104 and linearly extending. The first terminal 104 extends from a one edge of the base portion 105 in a width direction. Both surfaces of the first terminal 104 and both surfaces of the base portion 105 are arranged on the same plane.

The connection 103 is formed in a belt-like shape and linearly extended. Furthermore, the connection 103 is connected to one end of the base portion 105 of the first terminal portion 101, and the longitudinal direction of the connection 103 crosses against the longitudinal direction of the base portion 105. In illustration example, the connection 103 extends from the base portion 105 of the first terminal portion 101 toward a direction away from both the first terminal 104 and the base portion 105. Both surfaces of the connection 103 are arranged on the same plane as both surfaces of the first terminal 104 and both surfaces of the base portion 105.

The second terminal portion 102 has integrally a second terminal 106 connected to the terminal of the relay, and a base portion 107 continuing to a base end of the second terminal 106 and linearly extending. The second terminal 106 is arranged in an end portion of the base portion 107 away from the base portion 105. One edge of the base portion 107 in the width direction is connected to the connection 103. Furthermore, the second terminal 106 is arranged along a longitudinally direction of the first terminal 104 and the base portions 105, 107.

The above bus bar 101 is flexed to a right angle (about 90 degree) between the base portion 105 and the connection 103, and between the base portion 107 and the connection 103 each other. Furthermore, the base portions 105 and 107 in the bus bar 101 are arranged with a space parallel to each other.

Figure 9:
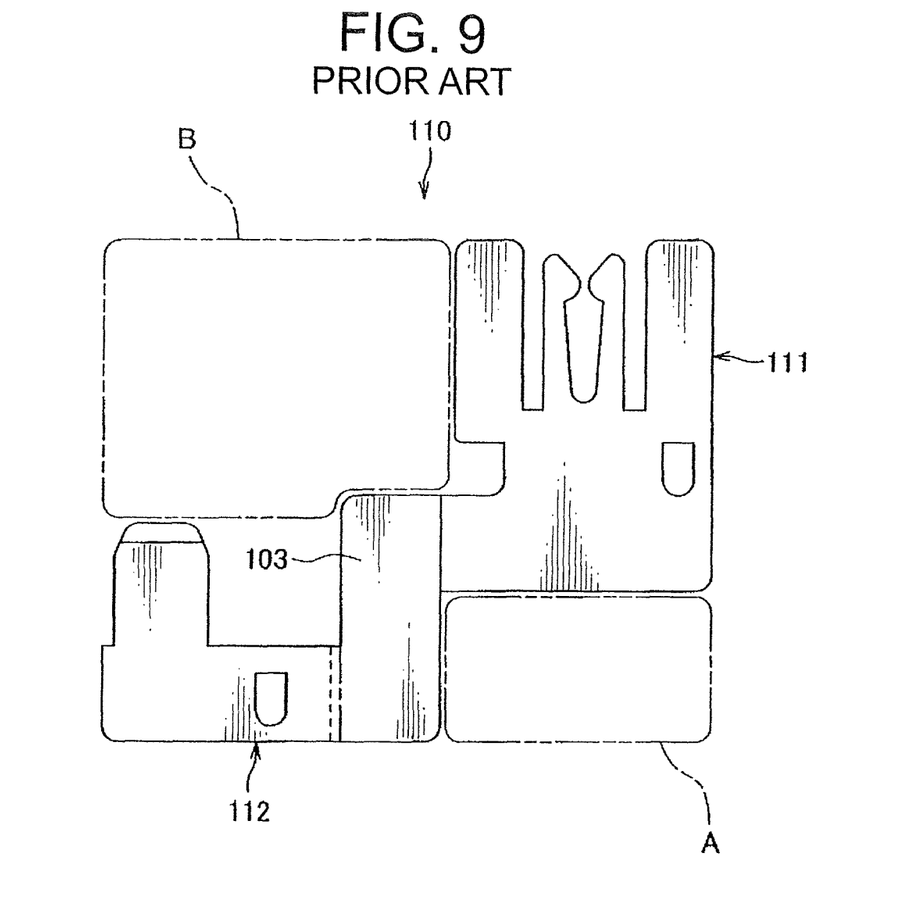
FIG. 9 is a plan view of a plate member for forming the bus bar shown in FIG. 7.

The bus bar 100 having the construction described above is manufactured as below. First, a plate member 110 shown in FIG. 9 is formed by punching a long plate, and then a first terminal portion equivalent 111 corresponding to the first terminal portion 101 and a second terminal portion equivalent 112 corresponding to the second terminal portion 102 are integrally formed. Thereafter, a border between a connection equivalent 113 and the first terminal portion equivalent 111 in the plate member 110 is flexed to a right angle, and a border between the connection equivalent 113 and the second terminal portion equivalent 112 is flexed to a right angle in the same direction as the border between a connection equivalent 113 and the first terminal portion equivalent 111.

The connection equivalent 113 is connected to the first and second terminal portion equivalents 111 and 112 in the plate member 110 so that the first and second terminal portion equivalents 111 and 112 are arranged along a longitudinal direction of a part corresponding to the base portions 105 and 107 in the above bus bar 100. For this reason, when the plate is punched, a section A (shown in FIG. 9 with two-dot chain line) surrounding with the first terminal portion equivalent 111 and the connection equivalent 113 and a section B (shown in FIG. 9 with two-dot chain line) surrounding with the first terminal portion equivalent 111 and the second terminal portion equivalent 112 are removed. Thus, the plate of the sections A and B is used with the bus bar 100, and those sections A and B go to waste. For this reason, material yield, that is, the rate of utilization of material trends toward a decrease in the conventional bus bar 100 shown in FIGS. 7 and 8.

Accordingly, an object of the present invention is to provide a plate member a bus bar, and an electric junction box having the bus bar which can improve the material yield.

Patent Document 1: Japanese Published Application No. H09-45213

SUMMARY OF THE INVENTION

Objects to be Solved

In order to solve and attain the above object, a plate member of the present invention in claim 1 so as to form a bus bar which is attached to a box main body of an electric junction box and includes a first terminal portion having a first terminal, a second terminal portion having a second terminal and a straight connection coupling the first terminal portion to the second terminal portion, the plate member includes a first terminal portion equivalent corresponding to the first terminal portion; a second terminal portion equivalent corresponding to the second terminal portion, and arranged with a space against the first terminal portion equivalent along a longitudinal direction of a first terminal equivalent corresponding to the first terminal of the first terminal portion equivalent; and a connection equivalent corresponding to the connection, and coupling the first terminal equivalent to the second terminal equivalent so that a longitudinal direction of a second terminal equivalent corresponding to the second terminal of the second terminal portion equivalent and the longitudinal direction of the first terminal equivalent are arranged parallel to each other, wherein both surfaces of the first terminal portion equivalent, both surfaces of the second terminal portion equivalent, and both surfaces of the connection equivalent are arranged on the same plane.

Furthermore, a bus bar attached to a box main body of an electric junction box of the present invention in claim 2 includes a first terminal portion having a first base portion and a first terminal connected to one outer edge of the first base portion; a second terminal portion having a second base portion and a second terminal connected to one outer edge of the second base portion; and a connection connected to the other outer edge of the first base portion, which the other outer edge is located in a back side of the one outer edge, and the one outer edge of the second base portion, wherein a border between the other outer edge of the first base portion and the connection and a border between the one outer edge of the second base portion and the connection are bent in a opposite direction each other.

Furthermore, an electric junction box having a box main body and a bus bar attached to the box main body in the present invention in claim 3 includes the bus bar described in claim 2 as the bus bar.

Effect of the Invention

According to the first aspect of the present invention, the second terminal portion equivalent is positioned at a part surrounded with the first terminal portion equivalent and the connection equivalent. For this reason, it is not required to remove the part surrounded with the first terminal portion equivalent and the connection equivalent. Thus, the part is not wasted, and can be used as the second terminal portion equivalent. So, a part wasted in the conventional plate member can be reduced, and material yield can be improved.

Furthermore, according to the second aspect of the present invention, when a flexion between the connection and the first terminal portion, and a flexion between the connection and the second terminal portion are stretched, the first terminal portion and the second terminal portion are arranged along the longitudinal directions of the first and second terminals. For this reason, it is not required to remove parts of both sides of the first and second terminal portions in the width direction. Thus, the parts are not wasted, and can be used as the bus bar. So, a part wasted in the conventional plate member can be reduced, and material yield can be increased.

Furthermore, according to the second aspect of the present invention, since the electric junction box of the present invention includes the bus bar in claim 2, material yield of the bus bar 3 can be improved.

The above and other objects and features of this invention will become more apparent from the following description taken in conjunction with the accompanying drawings.

DESCRIPTION OF THE PREFERRED EMBODIMENT

Figure 1:
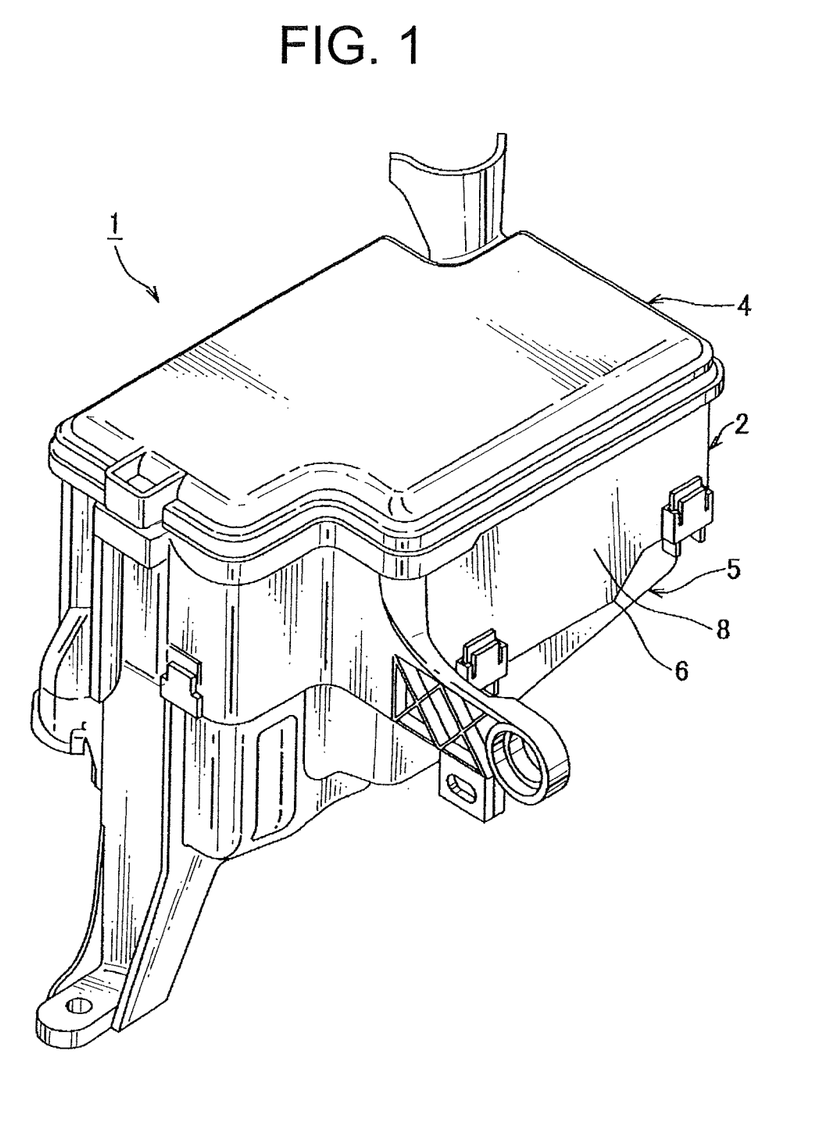
FIG. 1 is a perspective view of an electric junction box of an embodiment in the preset invention.

Hereafter, an electric junction box according to an embodiment of the present invention will be explained with reference to FIGS. 1 to 6. The electric junction box 1 shown in FIG. 1 according to the embodiment is mounted on a vehicle as a moving object. As shown in FIG. 1, the electric junction box 1 has a box main body 2, a plurality of bus bars 3 (see FIGS. 4 and 5) attached to a cassette block of the box main body 2, an upper cover 4 covering an upper surface of the box main body 2, and a lower cover 5 covering a lower surface of the box main body 2.

Figure 2:
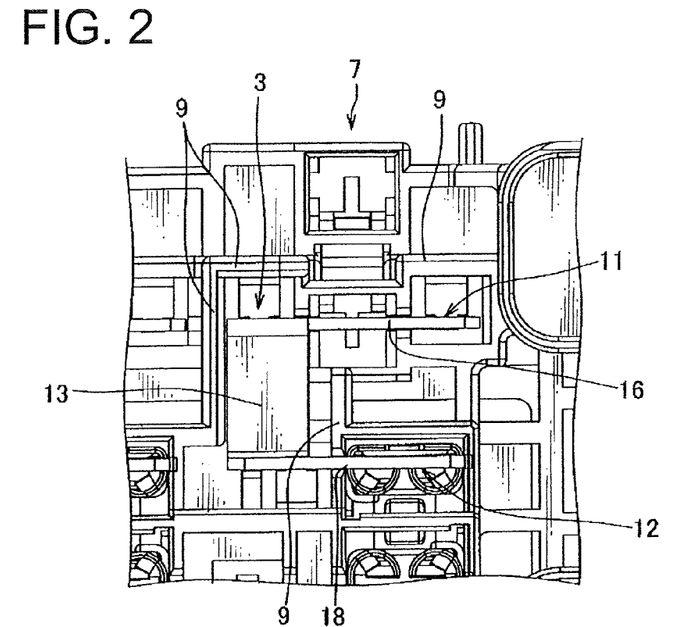
FIG. 2 is a plan view of a main part of a cassette block in the electric junction box shown in FIG. 1.
Figure 3:
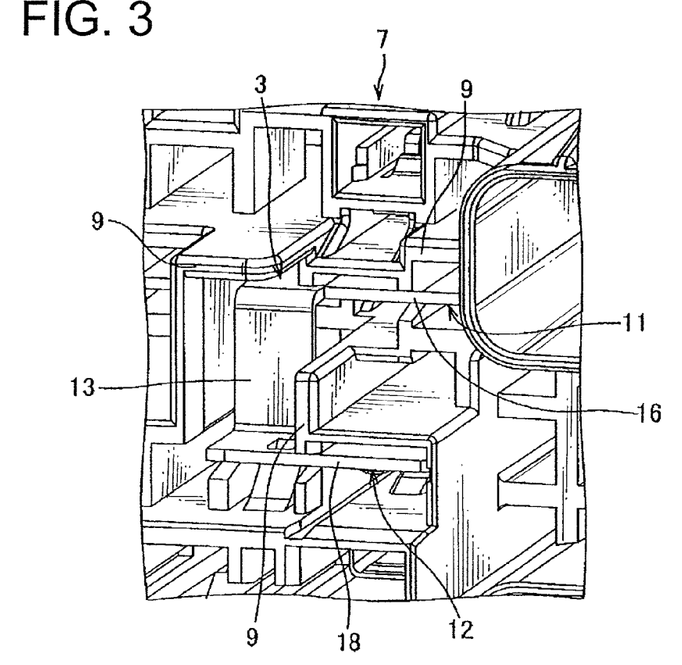
FIG. 3 is a perspective view of the main part of the cassette block shown in FIG. 2.

The box main body 2 has an outer frame 6 and a plurality of the cassette blocks 7. In FIGS. 2 and 3, a main part of one of the cassette block 7 is shown. The outer frame 6 is made of synthetic resin, and formed by well-known injection molding. Furthermore, the outer frame 6 has a plurality of outer walls 8, and is formed in a box shape with the outer walls 8. A plurality of fitting holes (not shown) are arranged inside of the outer frame 6, and separated by a plurality of partition walls 9. The fitting holes are space surrounded with the outer walls 8 constructing the outer wall 6 and the partition walls. Both ends of the fitting holes are opened. Therefore, the outer frame 6 is formed in a cylinder shape, or tube shape. Furthermore, an engagement receiving portion (not shown in drawings) which engages with the cassette block 7 is arranged in an inner surface of the fitting hole.

The cassette block 7 is made of synthetic resin of insulating performance, and formed by injection molding. As shown in FIGS. 2 and 3, the cassette block 7 is formed in a box shape with a size which is able to be received in the fitting hole. The cassette block 7 is inserted into the fitting hole through an open of one of the fitting hole. As shown in FIGS. 2 and 3, a space inside of the cassette block 7 is separated by the partition walls 9 into a plurality of spaces. For example, an electric component such as a relay or a fuse is installed in an upper surface of the cassette block 7. In addition, a connector of a wiring harness which is arranged in the vehicle is installed in a lower surface of the cassette block 7. An electric wire which attaches the connector to a terminal of the wiring harness is connected to various electronic devices which are mounted on the vehicle. Furthermore, the cassette block 7 receives the bus bar 3 into the space between the partition walls 9.

The box main body 2 is assembled by receiving the predefined cassette block 7 into the fitting hole of the outer frame 6. Then, the electric component is installed in the upper surface (corresponding to an upper surface of the box main body 2) of the cassette block 7, and the connector of the wiring harness is installed in the lower surface (corresponding to a lower surface of the box main body 2) of the cassette block 7. Additionally, a power cable supplying electric power from a battery of the vehicle or electric generator is attached to the box main body 2.

Figure 4:
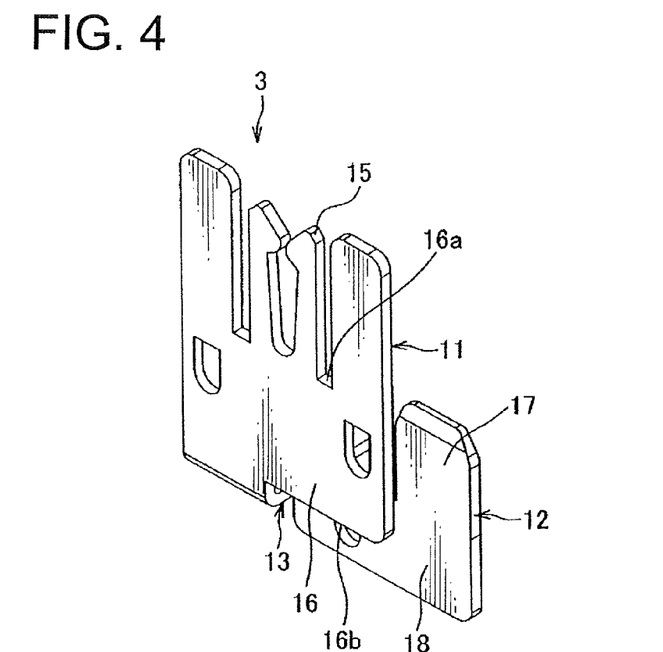
FIG. 4 is a perspective view showing a bus bar of the electric junction box shown in FIG. 1.
Figure 5:
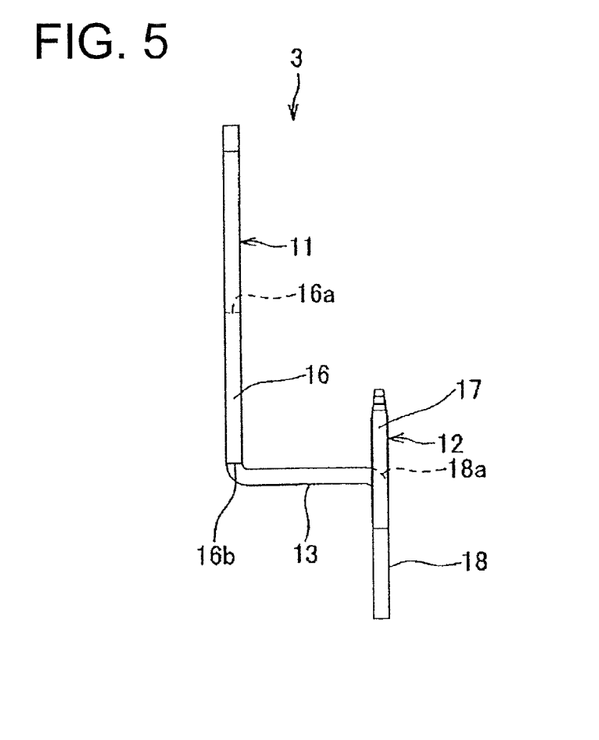
FIG. 5 is a side view of the bus bar shown in FIG. 4.
Figure 6:
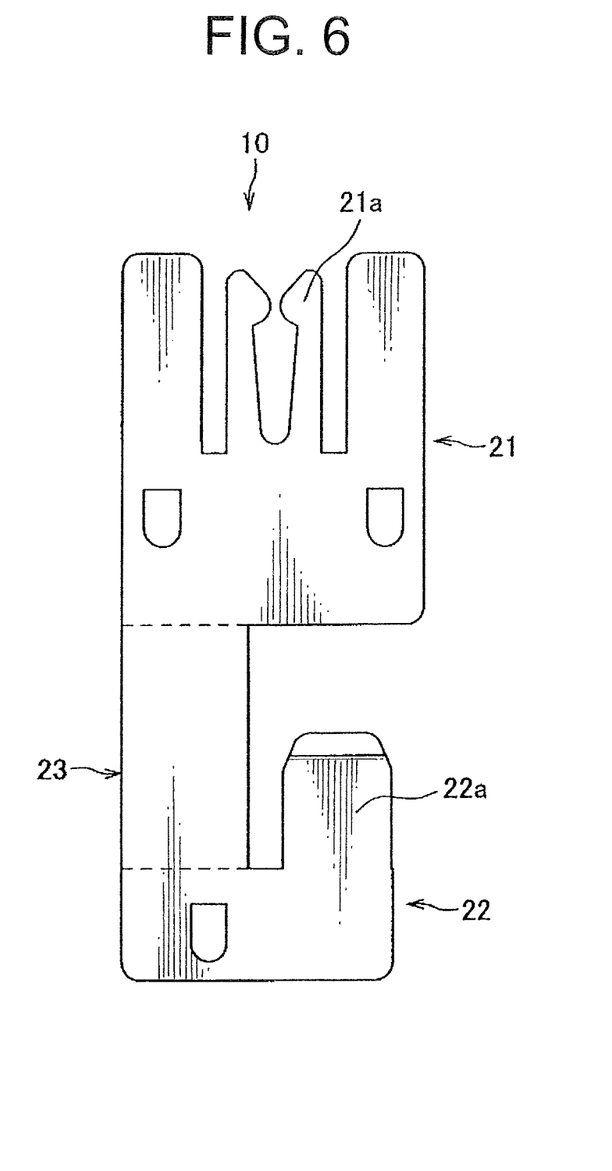
FIG. 6 is a plan view of a plate member for forming the bus bar shown in FIG. 4.

One example of the bus bar 3 is shown in FIGS. 4 and 5. A plate member 10 shown in FIG. 6 is formed by punching a conductive long plane (not shown), and then the bus bar 3 is formed by bending the plate member 10.

The bus bar 3 shown in FIGS. 4 and 5 has integrally a first terminal portion 11 connected to the fuse, a second terminal portion 12 connecting the relay, and a connection 13 coupling the first terminal portion 11 to the second terminal portion 12.

The first terminal portion 11 has integrally a first terminal 15 connected to a terminal of the fuse, and a first base portion 16 connected to a base end of the first terminal 15 and extending straightly. The first terminal 15 extends from one outer edge 16a of the first base portion 16 in the width direction. Also, in the example shown in drawings, a longitudinal direction of the first terminal 15 and a longitudinal direction of the first base portion 16 are at right angles to each other. Furthermore, both surfaces of the first terminal 15 and both surfaces of the first base portion 16 are arranged in the same plane, respectively.

The second terminal portion 12 has integrally a second straight terminal 17 connected to the terminal of the relay, and a second base portion 18 connected to a base end of the second terminal 17 and extending straightly. The second terminal 17 extends from one outer edge 18a of the second base portion 18 in the width direction toward the same direction as the first terminal 15. Also, in the example shown in drawings, a longitudinal direction of the second terminal 17 and a longitudinal direction of the second base portion 18 are at right angles to each other. Furthermore, both surfaces of the second terminal 17 and both surfaces of the second base portion 18 are arranged in the same plane.

The connection 13 extends straightly, and is formed in a belt-shape. One end of the connection 13 is connected to the other outer edge 16b, which is positioned in a back side of the one outer edge 16a, of the first base portion 16 in the first terminal portion 11. The other end of the connection 13 is connected to the one outer edge 18a of the second base portion 18 of the second terminal portion 12. A longitudinal direction of the connection 13 is parallel to both the longitudinal direction of the first terminal 15 of the first terminal portion 11 and the longitudinal direction of the second terminal 17 of the second terminal portion 12. Namely, the longitudinal direction of the first terminal 15 is parallel to the longitudinal direction of the second terminal 17.

Furthermore, as shown in FIG. 5, the first terminal portion 11 is bent between the other edge 16b of the first base portion 16 and the connection 13 to about 90 degrees. In addition, the second terminal portion 12 is bent between the one outer edge 18a of the second base portion 18 and the connection 13 at about 90 degrees. That is, the both surfaces of both the first terminal portion 11 and second terminal portion 12 and the both surfaces of the connection 13 are at right angles to each other.

The plate member 10 so as to form the bus bar 3 having the configuration described above, as shown in FIG. 6, has integrally a first terminal portion equivalent 21 corresponding to the first terminal portion 11, a second terminal portion equivalent 22 corresponding to the second terminal portion 12, and a straight connection equivalent 23 corresponding to the connection 13. Both surfaces of the first terminal portion equivalent 21, both surfaces of the second terminal portion equivalent 22, and both surfaces of the connection equivalent 23 are arranged in the same plane.

In the plate member 10, the first terminal portion equivalent 21 and the second terminal portion equivalent 22 are arranged with a space each other along a longitudinal direction of a first terminal equivalent 21a corresponding to the first terminal 15 of the first terminal portion equivalent 21 and a longitudinal direction of a second terminal equivalent 22a corresponding to the second terminal 17 of the second terminal portion equivalent 22. Furthermore, the connection equivalent 23 connects the first terminal portion equivalent 21 and the second terminal portion equivalent 22 in the plate member 10 so that the longitudinal direction of the first terminal equivalent 21a are the longitudinal direction of a second terminal equivalent 22a are arranged parallel to each other.

The bus bar 3 having the construction described above is formed by bending a border (shown in FIG. 6 with one chain line) between the other outer edge 16b of the first base portion 16 and the connection 13, and a border (shown in FIG. 6 with one chain line) between the one outer edge 18a of the second base portion 18 and the connection 13 in the plate member 10 to about 90 degrees in a opposite direction each other. As shown in FIGS. 2 and 3, the bus bar 3 formed by such above method is received in a space arranged between the partition walls of the cassette block 7, and attached to the cassette block 7 in the main body box 2. When the bus bar 3 is attached to the cassette block (namely the box main body 2), the power cable, the terminal of the connector of the wiring harness (namely, electric wire), and the electric component are electrically connected according to a predefined pattern.

The upper cover and the lower cover are made of insulated synthetic resin, and attached to the box main body 2. The upper cover 4 covers the upper surface of the box main body 2, and the lower cover 5 covers the lower surface of the box main body 2.

The electric junction box 1 described above separates electric power from the power source supplied through the power cable into the bus bar 3. Thereafter, the electric junction box 1 divides the electric power into various electronic devices mounted on the vehicle through the fuse and the relay with each electric wire of the wiring harness.

According to the embodiment of the present invention, the first terminal portion equivalent 21 and the second terminal portion equivalent 22 are arranged with a space each other along the longitudinal directions of the first and second terminal equivalents 21a, 22a. Furthermore, the connection equivalent 23 couples the first and second terminal portion equivalent 21, 22 each other so that the longitudinal directions of the first and second terminal equivalents 21a, 22a. Therefore, the second terminal portion equivalent 22 is positioned at a part surrounded with the first terminal portion equivalent 21 and the connection equivalent 23. For this reason, it is not required to remove the part surrounded with the first terminal portion equivalent 21 and the connection equivalent 23. Thus, the part is not wasted, and can be used as the second terminal portion equivalent 22. So, a part wasted in the conventional plate member can be reduced, and material yield can be improved.

Furthermore, the connection 13 is connected to the other outer edge 16b of the first base portion 16 and the one outer edge 18a of the second base portion 18. As a result, when a flexion between the connection 13 and the first terminal portion 11, and a flexion between the connection 13 and the second terminal portion 12 are stretched, the first terminal portion 11 and the second terminal portion 12 are arranged along the longitudinal directions of the first and second terminals 15, 17. For this reason, it is not required to remove parts of both sides of the first and second terminal portions 11, 12 in the width direction. Thus, the parts are not wasted, and can be used as the bus bar 3. So, a part wasted in the conventional plate member can be reduced, and material yield can be increased.

Furthermore, the electric junction box 1 includes the bus bar 3 having the construction described above. Thus, material yield of the bus bar 3 can be improved.

While, in the embodiment, the present invention is described, it is not limited thereto. Various change and modifications can be made with the scope of the present invention.

What is claimed is:

1. A plate member for forming a bus bar which is attached to a box main body of an electric junction box and includes a first terminal portion having a first terminal, a second terminal portion having a second terminal and a straight connection coupling the first terminal portion to the second terminal portion, the plate member comprising:
   a first terminal portion equivalent corresponding to the first terminal portion;
   a second terminal portion equivalent corresponding to the second terminal portion, and arranged with a space against the first terminal portion equivalent along a longitudinal direction of a first terminal equivalent corresponding to the first terminal of the first terminal portion equivalent; and
   a connection equivalent corresponding to the connection, and coupling the first terminal equivalent to a second terminal equivalent so that a longitudinal direction of the second terminal equivalent corresponding to the second terminal of the second terminal portion equivalent and the longitudinal direction of the first terminal equivalent are arranged parallel to each other,
   wherein both surfaces of the first terminal portion equivalent, both surfaces of the second terminal portion equivalent, and both surfaces of the connection equivalent are arranged on the same plane, and
   wherein the second terminal equivalent and the connection equivalent are disposed in parallel and formed on an edge of a second base portion of the second terminal equivalent.

2. The plate member according to claim 1, wherein
   the longitudinal direction of the first terminal equivalent, the longitudinal direction of the second terminal equivalent, and a longitudinal direction of the connection equivalent in which the first terminal equivalent is coupled to the second terminal equivalent are parallel, and
   the second terminal equivalent and the connection equivalent are juxtaposed each other.

3. The plate member according to claim 1, wherein
   the first terminal portion equivalent, the connection equivalent, and the second base portion share an outer edge.

4. A bus bar attached to a box main body of an electric junction box comprising:
   a first terminal portion having a first base portion and a first terminal connected to one outer edge of the first base portion;
   a second terminal portion having a second base portion and a second terminal connected to one outer edge of the second base portion; and
   a connection connected to the other outer edge of the first base portion, which the other outer edge is located in a back side of the one outer edge, and the one outer edge of the second base portion,
   wherein a border between the other outer edge of the first base portion and the connection and a border between the one outer edge of the second base portion and the connection are bent in a opposite direction each other where the first terminal portion and the second terminal portion face each other in different planes.

5. The electric junction box having the box main body and the bus bar described in claim 4 and attached to the box main body.

* * * * *